W. YEAKLE.
BRAN-DUSTERS.
No. 194,285. Patented Aug. 14, 1877.
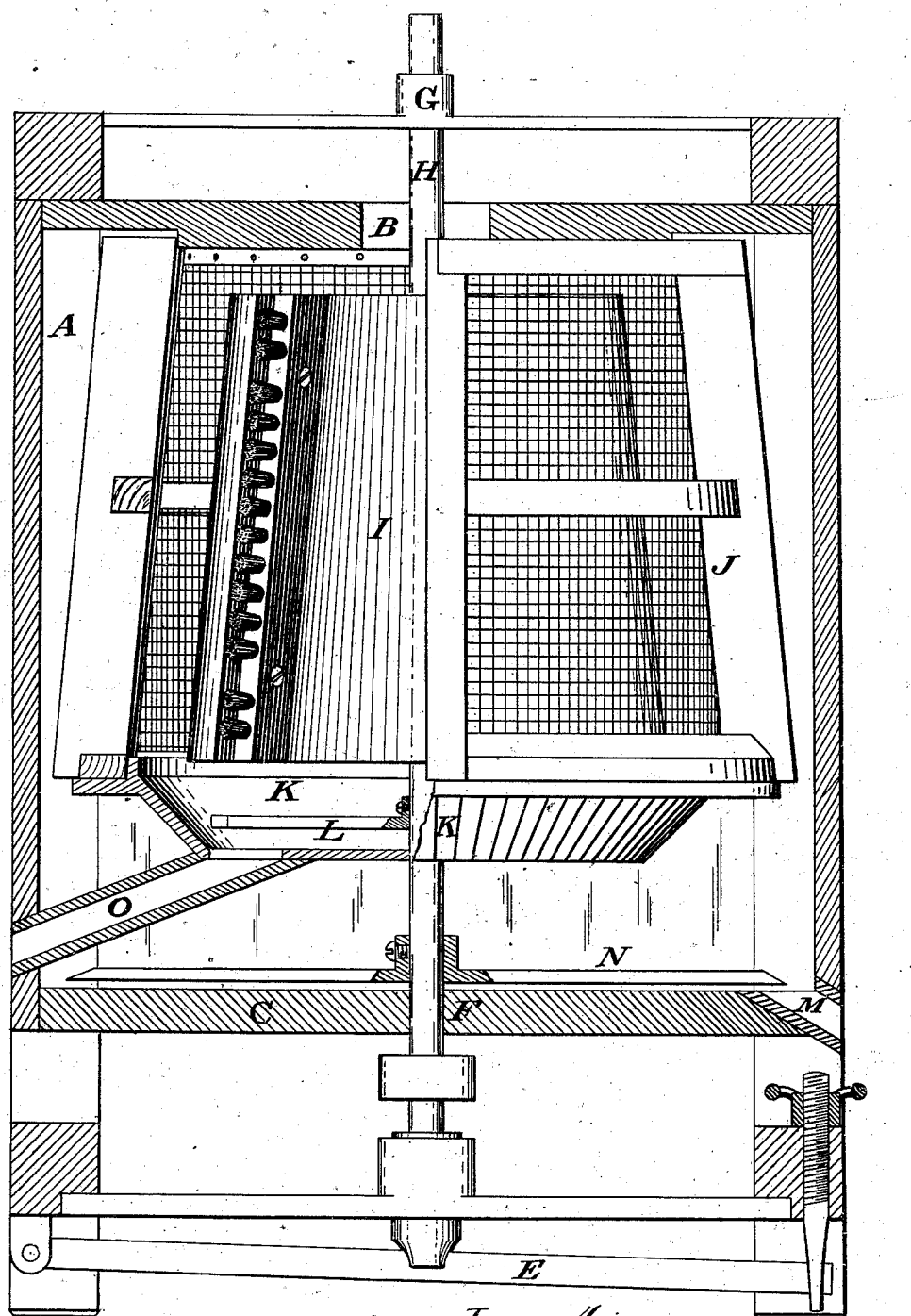
Attest-
Walter Knight
S. F. Sturdevant
Inventor
William Yeakle
By Knight Bros. Attys.

UNITED STATES PATENT OFFICE.

WILLIAM YEAKLE, OF HAMILTON, OHIO, ASSIGNOR TO HAMILTON MILLING AND MILL FURNISHING COMPANY, OF SAME PLACE.

IMPROVEMENT IN BRAN-DUSTERS.

Specification forming part of Letters Patent No. 194,285, dated August 14, 1877; application filed May 18, 1877.

*To all whom it may concern:*

Be it known that I, WILLIAM YEAKLE, of Hamilton, Butler county, Ohio, have invented a new and useful Improvement in Bran-Dusters, of which the following is a specification:

My invention relates to a more efficient form and arrangement of the several parts and members of a bran-duster.

My said duster comprises a customary flour-chest or casing, within which is journaled the usual vertical shaft of a rotary scourer and beater which, with its containing-screen, is in my improvement of the downwardly-flaring form.

My bran-chamber floor has the form of an inverted conical frustum, whence the bran or offal is discharged, at a point at or about the same distance from the axis as the periphery of the beater at its top or smallest part.

There is the usual central feed-hole at the top of the casing and sweep and flour-delivery at the bottom of the same.

In the accompanying drawing of my improvement, the beater and a portion of the screen are shown in elevation, and the casing in vertical section.

The following members may be of customary construction: The inclosing chest or casing A constitutes the flour-chamber, said chamber having the usual floor C, spout M; and the accustomed central feed-aperture B. E represents the usual adjustable bridge-tree, and F G the other bearings of a vertical shaft, H, armed with the scouring and beating member I, which, with its containing wire-gauze screen J, are of the represented downwardly-flaring conical form. A sweep, L, extends horizontally from that part of the shaft H which intervenes between the beater and the bran-chamber floor K. Another sweep, N, delivers the flour from the casing.

Such down-flaring screens and beaters whose issue for the offal is at their widest part are subject to the objection of wasting flour in consequence of its being carried off too freely along with the descending bran; while, on the other hand, in those of an inverted conical, and even in those of cylindrical form, the feed accumulates too much and chokes the machine.

In order to combine the advantages of a downward flare of scouring-surfaces with a properly-checked delivery, I give the bran-chamber K the shape of a bowl or inverted conical frustum, as represented, and locate the bran-spout O at or about the same radial distance as the top of the conical beater.

Hence, with a more contracted top to the scouring-cones the bran-spout will be located correspondingly nearer to the center, and vice versa, because the velocity of bran-delivery will vary directly with each increase or decrease of flare, and will require to be checked accordingly by a location of the bran-spout nearer to or farther from the center. By this location of the bran-spout in a bowl or dish formed bran-chamber I secure a moderate upward suction of air, which, encountering the bran while descending the shelving sides of the chamber, arrests and returns any particles of flour that may be accompanying the bran, without preventing the escape of the latter.

In my improvement those parts of the bran-floor contiguous to the shaft and screen, respectively, are wholly devoid of apertures, with the object of avoiding the opposite objections of a too sluggish and of a too rapid delivery.

I claim as new and of my invention—

1. In a downwardly-flaring bran-duster, the bowl-shaped bran-chamber K, whose outlet O is at or about midway between its center and circumference, substantially as set forth.

2. The bran-chamber K of the represented bowl, of inverted-frustum shape, whose bran-spout O is at or about the same radial distance as the periphery of the beater top, as and for the objects set forth.

In testimony of which invention I hereunto set my hand.

WM. YEAKLE.

Attest:
GEO. H. KNIGHT,
STEPHEN HUGHES.